(12) United States Patent
Tomita (10) Patent No.: US 9,738,241 B2
(45) Date of Patent: Aug. 22, 2017

(54) BUMPER ABSORBER ATTACHMENT STRUCTURE (71) Applicant: TOYOTA JIDOSHA KABUSHIKI KAISHA, Toyota-shi, Aichi-ken (JP)

(72) Inventor: Yasuhiro Tomita, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/014,996

(22) Filed: Feb. 3, 2016

(65) Prior Publication Data

US 2016/0257271 A1 Sep. 8, 2016

(30) Foreign Application Priority Data

Mar. 4, 2015 (JP) .................. 2015-042829

(51) Int. Cl.
*B60R 19/34* (2006.01)
*B60R 19/18* (2006.01)

(52) U.S. Cl.
CPC .............. *B60R 19/34* (2013.01); *B60R 19/18* (2013.01); *B60R 2019/1873* (2013.01)

(58) Field of Classification Search
CPC .. B60R 19/34; B60R 19/18; B60R 2019/1873
See application file for complete search history.

(56) References Cited

U.S. PATENT DOCUMENTS 7,390,039 B2 * 6/2008 Adachi ................... B60R 19/18
293/120
7,943,636 B2 * 5/2011 Hays .................... C07D 471/04
514/293

FOREIGN PATENT DOCUMENTS

JP 2005-067519 A 3/2005
JP 2007-137114 A 6/2007
JP 2007-145159 A 6/2007

* cited by examiner

*Primary Examiner* — Glenn Dayoan
*Assistant Examiner* — Melissa A Black
(74) *Attorney, Agent, or Firm* — Oliff PLC (57) ABSTRACT There is provided a bumper absorber attachment structure including (1) bumper reinforcement, (2) a first engaged portion that is formed at a vehicle upper side of a side face at a vehicle front side of the bumper reinforcement, (3) a second engaged portion that is formed at a vehicle lower side of the side face at the vehicle front side of the bumper reinforcement, (4) a bumper absorber that includes a thinned portion, an upper leg, and a lower leg, (5) a first engagement portion that is formed at a vehicle rear side of the upper leg, and that engages with the first engaged portion, and (6) a second engagement portion that is formed at a vehicle rear side of the lower leg, and that engages with the second engaged portion in a case in which the bumper absorber is displaced toward the vehicle lower side in a collision.

5 Claims, 4 Drawing Sheets

BUMPER ABSORBER ATTACHMENT STRUCTURE

CROSS-REFERENCE TO RELATED APPLICATION

This application claims priority under 35 USC 119 from Japanese Patent application No. 2015-042829 filed on Mar. 4, 2015, the disclosure of which is incorporated by reference herein.

BACKGROUND

Technical Field

The present disclosure relates to a bumper absorber attachment structure.

Background Art

Japanese Patent Application Laid-Open (JP-A) No. 2007-145159 describes a structure of a bumper absorber. Specifically, a cross-section of the bumper absorber orthogonal to the vehicle width direction is formed in a substantially U-shape, by a thinned portion open toward the vehicle rear side, an upper leg provided at the vehicle upper side of the thinned portion, and a lower leg provided at the vehicle lower side of the thinned portion. An engagement protrusion is formed projecting out toward the vehicle rear at a vehicle rear side end portion of the upper leg. An engagement hole is formed piercing through in the plate thickness direction at a side face at the vehicle front side of bumper reinforcement. The bumper absorber abuts the bumper reinforcement, and the engagement protrusion of the bumper absorber is inserted into the engagement hole of the bumper reinforcement, thereby attaching the bumper absorber to the vehicle front side of the bumper reinforcement.

SUMMARY

When collision load is input to the bumper absorber during a vehicle-to-vehicle collision, such as a minor collision, or a collision with a pedestrian, the bumper absorber transfers collision load to the bumper reinforcement and bears reaction force from the bumper reinforcement, and so undergoes compression deformation toward the vehicle rear side along the vehicle front-rear direction. Collision energy can be absorbed by this compression deformation of the bumper absorber. Since the thinned portion is formed to the bumper absorber, the bumper absorber itself is more liable to undergo compression deformation, enabling collision load borne by the pedestrian in a collision with a pedestrian to be reduced.

However, there is a possibility that the collision load acts so as to displace the bumper absorber toward the vehicle lower side due to an input position of the collision load to the bumper absorber. In such cases, in the configuration described in JP-A No. 2007-145159, although the upper leg engages with the bumper reinforcement, the lower leg does not engage with the bumper reinforcement. Thus, when the bumper absorber attempts to be displaced toward the vehicle lower side, there is a possibility that the lower leg is displaced toward the vehicle lower side originating at the thinned portion with respect to the upper leg that is engaged and does not move, and so no longer abuts the bumper reinforcement. When the lower leg no longer abuts the bumper reinforcement, there is a possibility that the bumper absorber cannot bear sufficient reaction force from the bumper reinforcement, and that the bumper absorber does not undergo compression deformation. Moreover, variations in assembly occur when the bumper absorber is made to engage with the bumper reinforcement, such that there is a need to secure ease of assembly of the bumper absorber.

In consideration of the above issues, the present disclosure obtains a bumper absorber attachment structure that is capable of absorbing collision load in various collision modes, while securing ease of assembly.

A first aspect of the present disclosure is a bumper absorber attachment structure including: bumper reinforcement that is provided at a vehicle front section and that is formed in an elongated shape with a length direction along a vehicle width direction; a first engaged portion that is formed at a vehicle upper side of at least one of both vehicle width direction end portions or a vehicle width direction center portion of a side face at a vehicle front side of the bumper reinforcement; a second engaged portion that is formed at a vehicle lower side of at least one out of both the vehicle width direction end portions or the vehicle width direction center portion of the side face at the vehicle front side of the bumper reinforcement; a bumper absorber that is configured including a thinned portion open toward a vehicle rear side at a vehicle vertical direction center portion, an upper leg disposed at the vehicle upper side of the thinned portion extending toward the vehicle rear side in a vehicle side cross-section view, and a lower leg disposed at the vehicle lower side of the thinned portion extending toward the vehicle rear side in the vehicle side cross-section view, and that abuts the side face at the vehicle front side of the bumper reinforcement; a first engagement portion that is formed at the vehicle rear side of the upper leg, and that engages with the first engaged portion such that the bumper absorber is restrained in an attached position with respect to the bumper reinforcement; and a second engagement portion that is formed at the vehicle rear side of the lower leg, and that engages with the second engaged portion in a case in which the bumper absorber is displaced toward the vehicle lower side in a collision.

A second aspect of the present disclosure is the bumper absorber attachment structure of the first aspect, wherein the first engaged portion and the second engaged portion are through-holes that pierce through a thickness direction of the side face at the vehicle front side of the bumper reinforcement, and that are respectively inserted with the first engagement portion and the second engagement portion.

A third aspect of the present disclosure is the bumper absorber attachment structure of the first aspect or the second aspect, wherein the first engaged portion and the second engaged portion are formed at both the vehicle width direction end portions of the side face at the vehicle front side of the bumper reinforcement.

A fourth aspect of the present disclosure is the bumper absorber attachment structure of any one of the first aspect to the third aspect, wherein the first engagement portion is press-fit-fixed to the first engaged portion, and the second engagement portion is fitted together with the second engaged portion such that there is some play therebetween.

In the first aspect, the thinned portion that is open toward the vehicle rear side is formed to the vehicle vertical direction center portion of the bumper absorber. Namely, a cross-section profile of the bumper absorber orthogonal to the vehicle width direction has an open cross-section. Thus, when collision load from the vehicle front side is input to the bumper absorber, the upper leg and the lower leg of the bumper absorber attempt to be displaced in separate directions to each other along the vehicle vertical direction. However, the first engagement portion formed to the upper leg of the bumper absorber engages with the first engaged portion so as to restrain the bumper absorber in the attached position with respect to the bumper reinforcement. Thus, in a collision such as a vehicle-to-vehicle collision or a collision with a pedestrian, collision load is input to the bumper absorber, and the upper leg can be suppressed from being displaced along the vehicle vertical direction. Moreover, when the bumper absorber is displaced toward the vehicle lower side due to collision load in a collision acting so as to displace the bumper absorber toward the vehicle lower side, the second engagement portion engages with the second engaged portion, thereby enabling greater displacement of the lower leg toward the vehicle lower side to be suppressed. Namely, since there is almost no displacement of the upper leg and the lower leg of the bumper absorber in separate directions to each other along the vehicle vertical direction, the state in which the bumper absorber abuts the bumper reinforcement is maintained. This accordingly enables the bumper absorber to bear reaction force from the bumper reinforcement, thereby enabling the entire bumper absorber to undergo compression deformation along the vehicle front-rear direction, and to absorb collision energy.

In a collision such as a vehicle-to-vehicle collision or a collision with a pedestrian, when the bumper absorber is displaced toward the vehicle lower side due to collision load acting so as to displace the bumper absorber toward the vehicle lower side, the second engagement portion formed to the lower leg of the bumper absorber engages with the second engaged portion. Namely, since the second engagement portion does not normally engage with the second engaged portion, variation in assembly when attaching the bumper absorber can be absorbed by the second engagement portion.

In the second aspect, the first engaged portion and the second engaged portion are through-holes. Thus, by inserting the first engagement portion and the second engagement portion into these through-holes, a vehicle lower side face of the first engagement portion and a vehicle lower side face of the second engagement portion respectively abut side faces of the through-holes, enabling the upper leg and the lower leg to be more reliably suppressed from being displaced along the vehicle vertical direction.

In the third aspect, the first engaged portion and the second engaged portion of the bumper reinforcement are formed to the vehicle width direction end portions of the bumper reinforcement, such that the present configuration can also be easily applied in cases in which the bumper reinforcement is configured by an extrusion molded component. Namely, in cases in which the first engaged portion and the second engaged portion are provided in an extrusion molded component, processing is performed from the cross-section outside in a state in which a receiving jig is provided at the cross-section inside at locations of the extrusion molded component where the first engaged portion and the second engaged portion are provided. However, in cases of an elongated shaped extrusion molded component such as the bumper reinforcement, it would be difficult to provide the receiving jig at a length direction center portion, such that processing to provide the first engaged portion and the second engaged portion at the vehicle width direction center portion would be difficult. In contrast thereto, in the present disclosure, the first engaged portion and the second engaged portion are provided at the vehicle width direction end portions of the bumper reinforcement, such that ease of processing is not reduced, even in cases in which an extrusion molded component is employed as the bumper reinforcement.

In the fourth aspect, since the second engagement portion at the lower leg of the bumper absorber is fitted together with the bumper reinforcement such that there is some play therebetween, variation in assembly can be absorbed at the lower leg side on attaching the bumper absorber to the bumper reinforcement. In addition thereto, since the first engagement portion is press-fit-fixed to the first engaged portion of the bumper reinforcement, an abutting relationship with the bumper reinforcement is maintained by the upper leg of the bumper absorber. Namely, in a hypothetical case in which the lower leg of the bumper absorber was press-fit-fixed, there would be a possibility that the upper leg (vehicle upper side) of the bumper absorber tilts toward the vehicle front side under the influence of gravity acting on the bumper absorber, and that a gap is formed between the bumper absorber and the bumper reinforcement. If there was a gap between the bumper absorber and the bumper reinforcement, there would be a possibility that the bumper absorber repeatedly abuts and moves away from the bumper reinforcement due to vibration of the vehicle or the like, causing a chattering noise to occur. In contrast thereto, in the present disclosure, the upper leg of the bumper absorber is press-fit-fixed to the bumper reinforcement and the abutting relationship thereto is maintained, such that the vehicle upper side of the bumper absorber does tilt toward the vehicle front side. This suppresses a gap from forming between the bumper absorber and the bumper reinforcement, and suppresses the chattering noise from occurring.

The bumper absorber attachment structure according to the first aspect of the present disclosure enables collision load to be absorbed in various collision modes, while securing ease of assembly.

The bumper absorber attachment structure according to the second aspect of the present disclosure enables the bumper absorber to be further suppressed from being displaced, and collision load to be absorbed.

The bumper absorber attachment structure according to the third aspect of the present disclosure enables collision load to be absorbed in various collision modes, without impairing ease of processing.

The bumper absorber attachment structure according to the fourth aspect of the present disclosure enables noise and vibration performance (NV performance) to be improved.

BRIEF DESCRIPTION OF DRAWINGS

Exemplary embodiments of the present disclosure will be described in detail based in the following figures, wherein.

DETAILED DESCRIPTION

First Exemplary Embodiment

Figure 1:
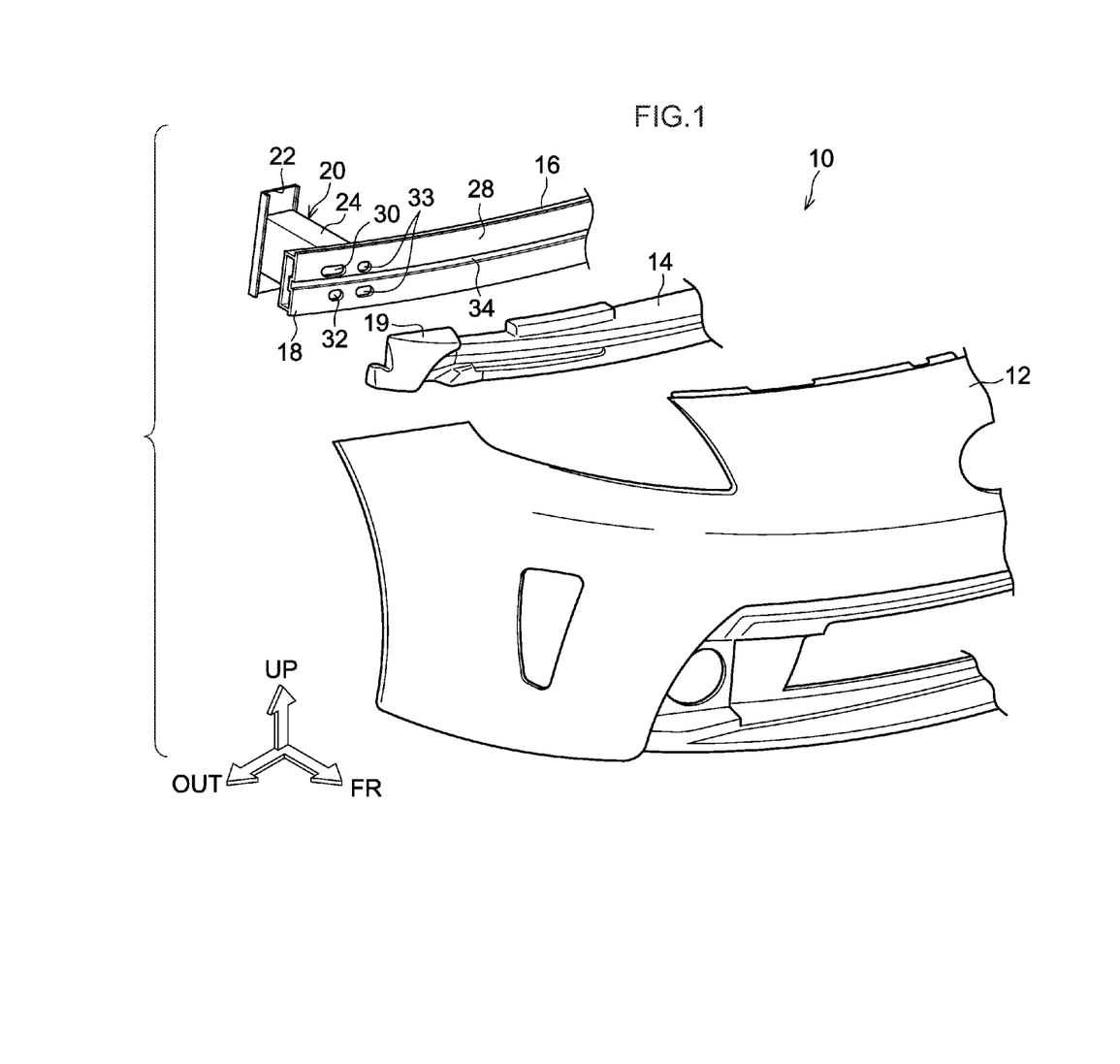
FIG. 1 is an exploded perspective view illustrating a vehicle front section including a bumper absorber attachment structure according to a first exemplary embodiment.
Figure 2:
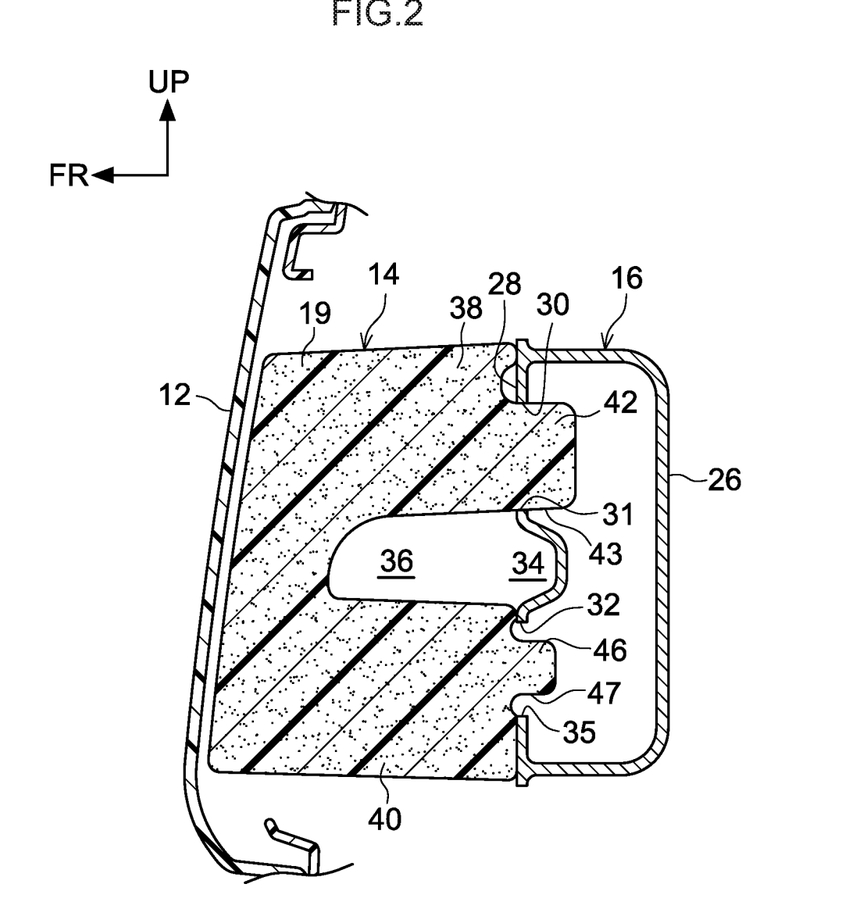
FIG. 2 is an enlarged cross-section illustrating relevant portions of a bumper absorber attachment structure according to the first exemplary embodiment.
Figure 3A:
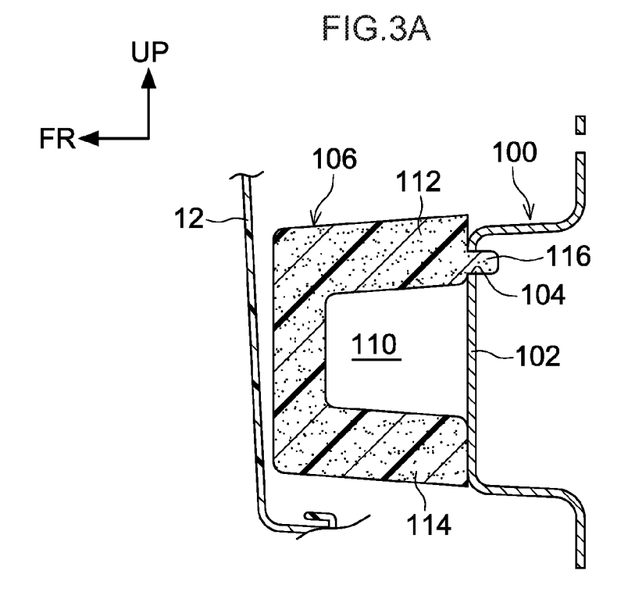
FIG. 3A is an enlarged cross-section illustrating relevant portions of a vehicle front section including a bumper absorber attachment structure according to a First Comparative Example.
Figure 3B:
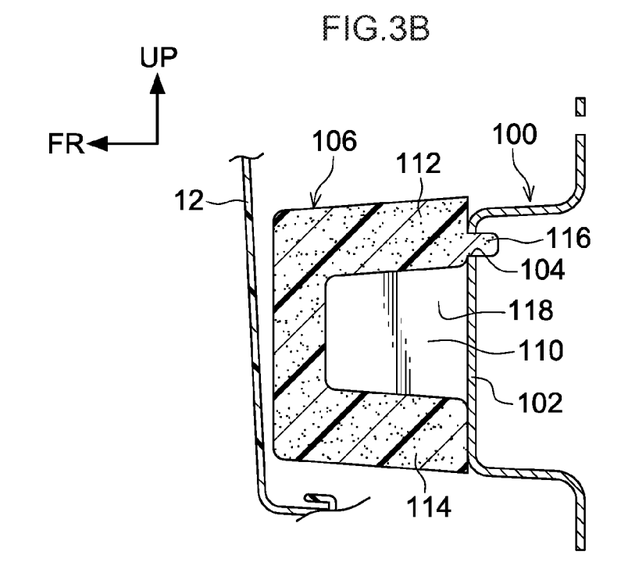
FIG. 3B is an enlarged cross-section illustrating relevant portions of a vehicle front section including a bumper absorber attachment structure according to a Second Comparative Example.

Explanation follows regarding a first exemplary embodiment of a bumper absorber attachment structure according to the present disclosure, with reference to FIG. 1 to FIG. 3. Note that in the drawings, the arrow FR indicates the vehicle front-rear direction front side, the arrow OUT indicates the vehicle width direction outside, and the arrow UP indicates the vehicle upper side, respectively.

As illustrated in FIG. 1, a front section of a vehicle 10 is configured including a front bumper cover 12, a front bumper absorber 14 serving as a bumper absorber, and front bumper reinforcement 16 serving as bumper reinforcement. The front bumper cover 12 is disposed at a foremost end of the vehicle 10, extends along the vehicle width direction, and is, as an example, configured as a styling face made of resin.

The front bumper reinforcement 16 is provided at the vehicle rear side of the front bumper cover 12. The front bumper reinforcement 16 is made of an aluminum alloy, formed in an elongated shape extending along the vehicle width direction, and a cross-section profile orthogonal to the vehicle width direction has a substantially rectangular shape with its length direction along the vehicle vertical direction.

A pair of left and right crash boxes 20 attached to front end portions of front side members, not illustrated in the drawings, are respectively provided in the vicinity of both end portions 18 in the vehicle width direction, namely, the length direction of the front bumper reinforcement 16. Each crash box 20 is configured of a base end bracket 22, and a projection portion 24 that projects out from the base end bracket 22 toward the vehicle front section. Each base end bracket 22 is attached to the front end portion of the front side member by fasteners, not illustrated in the drawings. A cross-section profile of the projection portion 24 orthogonal to the vehicle front-rear direction has a substantially rectangular shape. A vehicle front end portion, not illustrated in the drawings, of the projection portion 24 is fastened by fasteners, not illustrated in the drawings, to a side face 26 (see FIG. 2) at the vehicle rear side of the front bumper reinforcement 16. The front bumper reinforcement 16 is thereby fixed to the front side members with the crash boxes 20 interposed therebetween.

First engagement holes 30 each serving as a first engaged portion, and second engagement holes 32 each serving as a second engaged portion, are provided in a side face 28 at the vehicle front side of the front bumper reinforcement 16, in the vicinity of both the end portions 18. The first engagement holes 30 and the second engagement holes 32 are formed piercing through the side face 28 in the plate thickness direction.

Each first engagement hole 30 is formed in the vehicle upper side of the side face 28. Specifically, the first engagement hole 30 is formed further toward the vehicle upper side than a recessed portion 34 that is formed to a vehicle vertical direction center portion of the side face 28 and extends along the vehicle width direction. Note that the first engagement hole 30 is formed in a substantially rectangular shape with its length direction along the vehicle width direction in face-on view.

Each second engagement hole 32 is formed in the vehicle lower side of the side face 28. Specifically, the first engagement hole 30 is formed further toward the vehicle lower side than the recessed portion 34 formed to the side face 28. Note that the second engagement hole 32 is formed in a substantially circular shape in face-on view.

The first engagement hole 30 and the second engagement hole 32 are formed at positions corresponding to the fasteners that joins the vehicle front end portion of the projection portion 24 of the crash box 20 to the side face 26. The front bumper reinforcement 16 and the crash box 20 can thereby be fastened together by inserting a tool through the first engagement hole 30 and the second engagement hole 32 to fasten the fasteners. Note that through-holes 33 for fastening the fasteners of the crash box 20, similarly to the first engagement hole 30 and the second engagement hole 32, are formed to the side face 28 at the vehicle width direction inside of the first engagement hole 30 and the second engagement hole 32.

The front bumper absorber 14 serving as a bumper absorber is provided at the vehicle front side of a vehicle applied with the front bumper reinforcement 16, and the vehicle rear side of the front bumper cover 12. The front bumper absorber 14 is formed in an elongated shape running alongside the front bumper reinforcement 16, configured of a predetermined hardness by a foamed material such as resin, and undergoes compression deformation along the vehicle front-rear direction during a collision with a colliding body to absorb a predetermined energy. Specifically, as illustrated in FIG. 2, a thinned portion 36 open toward the vehicle rear side is provided to a vehicle vertical direction substantially center portion. An upper leg 38 that is disposed at the vehicle upper side of the thinned portion 36 and extends toward the vehicle rear side in vehicle side cross-section view, and a lower leg 40 that is disposed at the vehicle lower side of the thinned portion 36 and extends toward the vehicle rear side in vehicle side cross-section view, are also provided. A cross-section profile of the front bumper absorber 14 orthogonal to the vehicle width direction thereby has a substantially U-shape including the upper leg 38 that configures the vehicle upper side of the thinned portion 36, and the lower leg 40 that configures the vehicle lower side of the thinned portion 36. The thinned portion 36 functions as a weakened portion, thereby promoting compression deformation of the front bumper absorber 14 along the vehicle front-rear direction.

First engagement portions 42 are formed in the vicinity of both end portions 19 in the vehicle width direction of the front bumper absorber 14, at the vehicle rear side of the upper leg 38. Each first engagement portion 42 is provided at the vehicle upper side of the thinned portion 36, at a position corresponding to the respective first engagement hole 30 provided in the front bumper reinforcement 16, and is formed projecting out toward the vehicle rear side with respect to the upper leg 38. A vehicle vertical direction dimension of the first engagement portion 42 is set slightly longer than a vehicle vertical direction dimension of the first engagement hole 30. A vehicle width direction dimension of the first engagement portion 42 is also set slightly longer than a vehicle width direction dimension of the first engagement hole 30. Namely, the first engagement portion 42 is press-fit inside the first engagement hole 30. A vehicle lower side face 43 of the first engagement portion 42 thereby abuts a side face 31 of the first engagement hole 30.

Second engagement portions 46 are formed in the vicinity of both the vehicle width direction end portions 19 of the front bumper absorber 14, at the vehicle rear side of the lower leg 40. Each second engagement portion 46 is provided at the vehicle lower side of the thinned portion 36, at a position corresponding to the respective second engagement hole 32 provided in the front bumper reinforcement 16, and is formed projecting out toward the vehicle rear side with respect to the lower leg 40. A vehicle vertical direction dimension of the second engagement portion 46 is set shorter than a vehicle vertical direction of the second engagement hole 32. Namely, the second engagement portion 46 is fitted together with the second engagement hole 32 such that there is some play therebetween. This enables the second engagement portion 46 to be inserted inside the second engagement hole 32, while absorbing variations in the position of the second engagement portion 46 in the vehicle vertical direction with respect to the first engagement portion 42, and variations in assembly, or the like. A vehicle lower side face 47 of the second engagement portion 46 can abut a side face 35 of the second engagement hole 32 due to the second engagement portion 46 being displaced toward the vehicle lower side.

Explanation follows regarding operation of the first exemplary embodiment.

Explanation follows regarding operation of the present exemplary embodiment, with reference to a First Comparative Example and a Second Comparative Example illustrated in FIG. 3A and FIG. 3B. Note that similar configuration portions to the present exemplary embodiment are appended with the same reference numerals, and explanation thereof is omitted.

As illustrated in FIG. 3A, a cross-section of front bumper reinforcement 100 according to the First Comparative Example orthogonal to the vehicle width direction is formed in a substantially hat shape, including a front wall portion 102 projecting out toward the vehicle front side. An engagement hole 104 piercing through in the plate thickness direction is formed in the vehicle upper side of the front wall portion 102.

A front bumper absorber 106 is provided at the vehicle front side of a vehicle applied with the front bumper reinforcement 100 and the vehicle rear side of the front bumper cover 12. The front bumper absorber 106 is formed in an elongated shape running alongside the front bumper reinforcement 100. The front bumper absorber 106 is configured with a predetermined hardness by a foamed material such as urethane foam, and undergoes compression deformation along the vehicle front-rear direction in a collision with a colliding body to absorb a predetermined energy. Namely, a thinned portion 110 open toward the vehicle rear side is formed to a vehicle vertical direction substantially center portion. A cross-section profile of the front bumper absorber 106 orthogonal to the vehicle width direction is thereby formed in a substantially U-shape, including an upper leg 112 configuring the vehicle upper side, and a lower leg 114 configuring the vehicle lower side. The thinned portion 110 functions as what is referred to as a weakened portion, thereby promoting compression deformation of the front bumper absorber 106 along the vehicle front-rear direction.

An engagement portion 116 is formed at the vehicle rear side of the upper leg 112. The engagement portion 116 is provided at the vehicle upper side of the thinned portion 110 at a position corresponding to the engagement hole 104 of the front bumper reinforcement 100, and is formed projecting out toward the vehicle rear side with respect to the upper leg 112. A vehicle vertical direction dimension of the engagement portion 116 is substantially the same as a vehicle vertical direction dimension of the engagement hole 104. The engagement portion 116 is press-fit inside the engagement hole 104 from the vehicle front side. The front bumper absorber 106 is thereby attached to the front bumper reinforcement 100.

When collision load is input to the front bumper absorber 106 through the front bumper cover 12 in a vehicle-to-vehicle collision or a collision with a pedestrian, the front bumper absorber 106 transmits collision load to the front bumper reinforcement 100. The front bumper absorber 106 also bears reaction force from the front bumper reinforcement 100. The front bumper absorber 106 thereby undergoes compression deformation toward the vehicle rear side along the vehicle front-rear direction. Collision energy can be absorbed by this compression deformation of the front bumper absorber 106. Since the thinned portion 110 is formed to the front bumper absorber 106, the front bumper absorber 106 itself is more liable to be compressed, enabling collision load toward the pedestrian to be reduced in a collision with a pedestrian.

However, in the configuration of the First Comparative Example illustrated in FIG. 3A, although the upper leg 112 is press-fit inside the front bumper reinforcement 100, the lower leg 114 only abuts, and does not engage with, the front bumper reinforcement 100. By forming the thinned portion 110 between the upper leg 112 and the lower leg 114, the upper leg 112 and the lower leg 114 are more liable to deform in separate directions to each other. Thus, in cases in which collision load acts so as to displace the front bumper absorber 106 toward the vehicle lower side due to the input position of the collision load toward the front bumper absorber 106, the lower leg 114 is displaced toward the vehicle lower side originating at the thinned portion 110, with respect to the upper leg 112 that is fixed to the front bumper reinforcement 100 and does not move. There is accordingly a possibility that the lower leg 114 does not abut the front wall portion 102 of the front bumper reinforcement 100. In such cases, there is a possibility that the front bumper absorber 106 is unable to bear sufficient reaction force from the front bumper reinforcement 100, and that the front bumper absorber 106 does not undergo compression deformation along the vehicle front-rear direction.

In considerations of this point, as in the Second Comparative Example illustrated in FIG. 3B, it is conceivable that a coupling rib 118 that couples together the upper leg 112 and the lower leg 114 is provided inside the thinned portion 110 of the front bumper absorber 106, such that the lower leg 114 is suppressed from deforming in a separate direction to the upper leg 112. However, in such a configuration, the rigidity of the front bumper absorber 106 itself is increased by providing the coupling rib 118, such that there is a possibility that compression of the front bumper absorber 106 itself is difficult, and that collision load borne by the pedestrian in a collision with a pedestrian cannot be reduced.

As illustrated in FIG. 2, in contrast to the two Examples described above, in the present exemplary embodiment, the thinned portion 36 that is open toward the vehicle rear side is formed in the vehicle vertical direction center portion of the front bumper absorber 14. Namely, the cross-section profile of the front bumper absorber 14 orthogonal to the vehicle width direction has an open cross-section. Thus, when collision load from the vehicle front side is input to the front bumper absorber 14, the upper leg 38 and the lower leg 40 of the front bumper absorber 14 attempt to be displaced in separate directions to each other along the vehicle vertical direction. However, the first engagement portions 42 formed to the upper leg 38 of the front bumper absorber 14 engage with the first engagement holes 30 so as to restrain the front bumper absorber 14 in the attached position with respect to the front bumper reinforcement 16. Thus, in a collision such as a vehicle-to-vehicle collision or a collision with a pedestrian, collision load is input to the front bumper absorber 14, and the upper leg 38 can be suppressed from being displaced along the vehicle vertical direction. Moreover, when the front bumper absorber 14 is displaced toward the vehicle lower side due to collision load in a collision acting so as to displace the front bumper absorber 14 toward the vehicle lower side, the second engagement portions 46 engage with the second engagement holes 32, thereby enabling greater displacement of the lower leg 40 toward the vehicle lower side to be suppressed. Namely, since there is almost no displacement of the upper leg 38 and the lower leg 40 of the front bumper absorber 14 in separate directions to each other along the vehicle vertical direction, the state in which the front bumper absorber 14 abuts the front bumper reinforcement 16 is maintained. This accordingly enables the front bumper absorber 14 to bear reaction force from the front bumper reinforcement 16, thereby enabling the entire front bumper absorber 14 to undergo compression deformation along the vehicle front-rear direction, and to absorb collision energy.

In a collision such as a vehicle-to-vehicle collision or a collision with a pedestrian, when the front bumper absorber 14 is displaced toward the vehicle lower side due to collision load acting so as to displace the front bumper absorber 14 toward the vehicle lower side, the second engagement portions 46 formed to the lower leg 40 of the front bumper absorber 14 engage with the second engagement holes 32. Namely, since the second engagement portions 46 do not normally engage with the second engagement holes 32, variation in assembly when attaching the front bumper absorber 14 can be absorbed by the second engagement portions 46. This enables collision load in various collision modes to be absorbed, while securing ease of assembly.

Since the first engagement holes 30 and the second engagement holes 32 are through-holes, by inserting the first engagement portions 42 and the second engagement portions 46 into the respective through-holes, the vehicle lower side faces 43 of the first engagement portions 42 and the vehicle lower side faces 47 of the second engagement portions 46 respectively abut the side faces 31 of the first engagement holes 30 and the side faces 35 of the second engagement holes 32, enabling the upper leg 38 and the lower leg 40 to be more reliably suppressed from being displaced along the vehicle vertical direction. This enables the front bumper absorber 14 to be further suppressed from being displaced, and collision load to be absorbed.

Moreover, since the first engagement holes 30 and the second engagement holes 32 of the front bumper reinforcement 16 are formed to both the vehicle width direction end portions 18 of the front bumper reinforcement 16, the present configuration can also be easily applied to front bumper reinforcement 16 that is configured by an extrusion molded component. Namely, in cases in which the first engagement holes 30 and the second engagement holes 32 are provided in an extrusion molded component, processing is performed from the cross-section outside in a state in which a receiving jig is provided at the cross-section inside at locations of the extrusion molded component where the first engagement holes 30 and the second engagement holes 32 are provided. However, in cases of an elongated shaped extrusion molded component such as the front bumper reinforcement 16, it would be difficult to provide the receiving jig at a length direction center portion, such that processing to provide the first engagement holes 30 and the second engagement holes 32 at the vehicle width direction center portion would be difficult. In contrast thereto, in the present exemplary embodiment, the first engagement holes 30 and the second engagement holes 32 are only provided at both the vehicle width direction end portions 18 of the front bumper reinforcement 16, and therefore do not need to be provided at the vehicle width direction center portion of the front bumper reinforcement 16. Thus ease of processing is not reduced, even in cases in which an extrusion molded component is employed as the front bumper reinforcement 16. This enables collision load to be absorbed in various collision modes, without impairing ease of processing.

Moreover, since the second engagement portions 46 of the lower leg 40 of the front bumper absorber 14 are fitted together with the front bumper reinforcement 16 such that there is some play therebetween, variation in assembly can be absorbed at the lower leg 40 side on attaching the front bumper absorber 14 to the front bumper reinforcement 16. In addition thereto, since the first engagement portions 42 are press-fit-fixed to the first engagement holes 30 of the front bumper reinforcement 16, the abutting relationship with the front bumper reinforcement 16 is maintained by the upper leg 38 of the front bumper absorber 14. Namely, in contrast to the configuration illustrated in FIG. 2, in a hypothetical case in which the upper leg 38 of the front bumper absorber 14 was fitted together with play, and the lower leg 40 was press-fit-fixed, there would be a possibility that the upper leg 38 (vehicle upper side) of the front bumper absorber 14 tilts toward the vehicle front side under the influence of gravity acting on the front bumper absorber 14, and that a gap is formed between the front bumper absorber 14 and the front bumper reinforcement 16. If there was a gap between the front bumper absorber 14 and the front bumper reinforcement 16, there would be a possibility that the front bumper absorber 14 repeatedly abuts and moves away from the front bumper reinforcement 16 due to vibration of the vehicle or the like, causing a chattering noise to occur. In contrast thereto, in the present exemplary embodiment, the upper leg 38 of the front bumper absorber 14 is press-fit-fixed to the front bumper reinforcement 16 and the abutting relationship thereto is maintained, such that the vehicle upper side of the front bumper absorber 14 does not tilt toward the vehicle front side. This suppresses a gap from forming between the front bumper absorber 14 and the front bumper reinforcement 16, and suppresses the chattering noise from occurring. This enables NV performance to be improved.

The front bumper absorber 14 is configured of a foamed material such as resin, and there is a possibility that the shape changes due to thermal contraction. In particular, since the thinned portion 36 is formed at the vehicle vertical direction center, there is a possibility that the upper leg 38 and the lower leg 40 contract so as to collapse into the thinned portion 36. However, the first engagement portions 42 are provided at the vehicle upper side of the thinned portion 36, and the second engagement portions 46 are provided at the vehicle lower side of the thinned portion 36, in the front bumper absorber 14. The first engagement portions 42 and the second engagement portions 46 respectively engage with the first engagement holes 30 and the second engagement holes 32 of the front bumper reinforcement 16. Thus, even when the upper leg 38 and the lower leg 40 deform so as to collapse inward due to thermal contraction, the deformation is suppressed by the first engagement portions 42 and the second engagement portions 46. Hence the front bumper absorber 14 is straightened out so as to maintain a predetermined shape, even when the front bumper absorber 14 is influenced by thermal contraction.

Second Exemplary Embodiment

Figure 4:
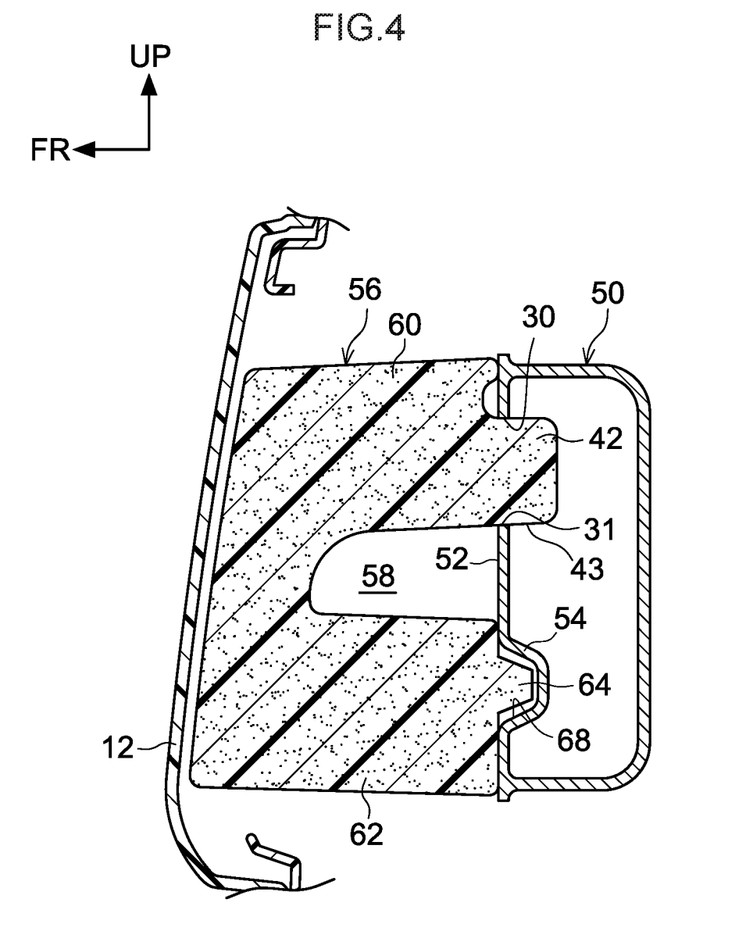
FIG. 4 is an exploded perspective view illustrating a vehicle front section including a bumper absorber attachment structure according to a second exemplary embodiment.

Explanation follows regarding a second exemplary embodiment of a bumper absorber attachment structure according to the present disclosure, with reference to FIG. 4. Note that similar configuration portions to the first exemplary embodiment and so on previously described are appended with the same reference numerals, and explanation thereof is omitted.

The basic configuration of the bumper absorber attachment structure according to the second exemplary embodiment is similar to that of the first exemplary embodiment, with a feature that the second engagement holes 32 are not formed to front bumper reinforcement 50.

Namely, the front bumper reinforcement 50 is made of an aluminum alloy, formed in an elongated shape extending along the vehicle width direction, and has a cross-section profile orthogonal to the vehicle width direction formed in a substantially rectangular shape with its length direction along the vehicle vertical direction.

The first engagement holes 30, and second engagement recessed portions 54 each serving as a second engaged portion, are provided in the vicinity of both the end portions 18 of a side face 52 at the vehicle front side of the front bumper reinforcement 50. Each second engagement recessed portion 54 is formed at the vehicle lower side of the side face 52, and is formed in a recessed shape toward the vehicle rear.

A front bumper absorber 56, serving as a bumper absorber, is provided at the vehicle front side of a vehicle applied with the front bumper reinforcement 50 and the vehicle rear side of the front bumper cover 12. The front bumper absorber 56 is formed in an elongated shape running alongside the front bumper reinforcement 50, configured with a predetermined hardness by a foamed material such as resin, and undergoes compression deformation along the vehicle front-rear direction to absorb a predetermined energy in a collision with a colliding body. A thinned portion 58 that is open toward the vehicle rear side is provided to a vehicle vertical direction substantially center portion of the front bumper absorber 56. An upper leg 60 that is disposed at the vehicle upper side of the thinned portion 58 and extends toward the vehicle rear side in vehicle side cross-section view, and a lower leg 62 that is disposed at the vehicle lower side of the thinned portion 58 and extends toward the vehicle rear side in vehicle side cross-section view, are also provided to the front bumper absorber 56. A cross-section profile of the front bumper absorber 56 orthogonal to the vehicle width direction is accordingly formed in a substantially U-shape, including the upper leg 60 configuring the vehicle upper side of the thinned portion 58, and the lower leg 62 configuring the vehicle lower side of the thinned portion 58.

The first engagement portions 42 are respectively formed in the vicinity of vehicle width direction end portions of the front bumper absorber 56, at the vehicle rear side of the upper leg 60. The first engagement portions 42 are press-fit inside the first engagement holes 30. Second engagement portions 64 are formed at the vehicle rear side of the lower leg 62 of the front bumper absorber 56. The second engagement portions 64 are provided at the vehicle lower side of the thinned portion 58, corresponding to the second engagement recessed portions 54 provided to the front bumper reinforcement 50, and are formed projecting out toward the vehicle rear side of the lower leg 62. The shape of each second engagement portion 64 is formed substantially the same as an inner peripheral face 68 of each second engagement recessed portion 54, and has a slightly smaller size than the inner peripheral face 68. The second engagement portions 64 are inserted inside the second engagement recessed portions 54. Namely, the second engagement portions 64 are fitted together with the second engagement recessed portions 54 such that there is some play therebetween.

Explanation follows regarding operation of the second exemplary embodiment.

As illustrated in FIG. 4, similarly to in the first exemplary embodiment, in the present exemplary embodiment, the thinned portion 58 open toward the vehicle rear side is formed at the vehicle vertical direction center portion of the front bumper absorber 56. Namely, the cross-section profile of the front bumper absorber 56 orthogonal to the vehicle width direction has an open cross-section. Thus, when collision load from the vehicle front side is input to the front bumper absorber 56, the upper leg 60 and the lower leg 62 of the front bumper absorber 56 attempt to be displaced in separate directions to each other along the vehicle vertical direction. However, the first engagement portions 42 formed to the upper leg 60 of the front bumper absorber 56 engage with the first engagement holes 30, such that the front bumper absorber 56 is restrained in the attached position with respect to the front bumper reinforcement 50. Thus, in a collision such as a vehicle-to-vehicle collision or a collision with a pedestrian, collision load is input to the front bumper absorber 56, and the upper leg 60 can be suppressed from being displaced along the vehicle vertical direction. Moreover, when the front bumper absorber 56 is displaced toward the vehicle lower side due to collision load in a collision acting so as to displace the front bumper absorber 56 toward the vehicle lower side, the second engagement portions 64 engage with the second engagement recessed portions 54, thereby enabling the lower leg 62 to be suppressed from greater displacement toward the vehicle lower side. Namely, since there is almost no displacement of the upper leg 60 and the lower leg 62 of the front bumper absorber 56 in separate directions to each other along the vehicle vertical direction, the state in which the front bumper absorber 56 abuts the front bumper reinforcement 50 is maintained. This accordingly enables the front bumper absorber 56 to bear reaction force from the front bumper reinforcement 50, thereby enabling the entire front bumper absorber 56 to undergo compression deformation along the vehicle front-rear direction, and collision energy to be absorbed.

In a collision such as a vehicle-to-vehicle collision or a collision with a pedestrian, when the front bumper absorber 56 is displaced toward the vehicle lower side due to collision load acting so as to displace the front bumper absorber 56 toward the vehicle lower side, the second engagement portions 64 formed to the lower leg 62 of the front bumper absorber 56 engage with the second engagement recessed portions 54. Namely, the second engagement portions 64 do not normally engage with the second engagement recessed portions 54, thereby enabling variation in assembly when attaching the front bumper absorber 56 to be absorbed by the second engagement portions 64. This enables collision load to be absorbed in various collision modes, while securing ease of assembly.

Moreover, since the first engagement holes 30 and the second engagement recessed portions 54 of the front bumper reinforcement 50 are formed to both the vehicle width direction end portions 18 of the front bumper reinforcement 50, the present configuration can also be easily applied to front bumper reinforcement 50 that is configured by an extrusion molded component. Namely, in cases in which the first engagement holes 30 and the second engagement recessed portions 54 are provided in an extrusion molded component, processing is performed from the cross-section outside in a state in which a receiving jig is provided at the cross-section inside at locations of the extrusion molded component where the first engagement holes 30 and the second engagement recessed portions 54 are provided. However, in cases of an elongated shaped extrusion molded component such as the front bumper reinforcement 50, it is difficult to provide the receiving jig at a length direction center portion, such that processing to provide the first engagement holes 30 and the second engagement recessed portions 54 at the vehicle width direction center portion would be difficult. In contrast thereto, in the present exemplary embodiment, the first engagement holes 30 and the second engagement recessed portions 54 are only provided at both the vehicle width direction end portions 18 of the front bumper reinforcement 50, and therefore do not need to be provided at the vehicle width direction center portion of the front bumper reinforcement 50. Thus ease of processing is not reduced, even in cases in which an extrusion molded component is employed as the front bumper reinforcement 50. This enables collision load to be absorbed in various collision modes, without impairing ease of processing.

Moreover, since the second engagement portions 64 of the lower leg 62 of the front bumper absorber 56 are fitted together with the front bumper reinforcement 50 such that there is some play therebetween, variation in assembly can be absorbed at the lower leg 62 side on attaching the front bumper absorber 56 to the front bumper reinforcement 50. In addition thereto, since the first engagement portions 42 are press-fit-fixed to the first engagement holes 30 of the front bumper reinforcement 50, the abutting relationship with the front bumper reinforcement 50 is maintained by the upper leg 60 of the front bumper absorber 56. Namely, in contrast to the configuration illustrated in FIG. 4, in a hypothetical case in which the upper leg 60 of the front bumper absorber 56 was fitted together with play, and the lower leg 62 was press-fit-fixed, there would be a possibility that the upper leg 60 (vehicle upper side) of the front bumper absorber 56 tilts toward the vehicle front side under the influence of gravity acting on the front bumper absorber 56, and that a gap is formed between the front bumper absorber 56 and the front bumper reinforcement 50. If there was a gap between the front bumper absorber 56 and the front bumper reinforcement 50, there would be a possibility that the front bumper absorber 14 repeatedly abuts and moves away from the front bumper reinforcement 16 due to vibration of the vehicle or the like, causing a chattering noise to occur. In contrast thereto, in the present exemplary embodiment, the upper leg 60 of the front bumper absorber 56 is press-fit-fixed to the front bumper reinforcement 50 and the abutting relationship thereto is maintained, such that the vehicle upper side of the front bumper absorber 56 does tilt toward the vehicle front side. This suppresses a gap from forming between the front bumper absorber 56 and the front bumper reinforcement 50, and suppresses the chattering noise from occurring. This enables NV performance to be improved.

The front bumper absorber 56 is configured of a foamed material such as resin, and there is a possibility that the shape changes due to thermal contraction. In particular, since the thinned portion 58 is formed at the vehicle vertical direction center, there is a possibility that the upper leg 60 and the lower leg 62 contract so as to collapse into the thinned portion 58. However, the first engagement portions 42 are provided at the vehicle upper side of the thinned portion 58, and the second engagement portions 64 are provided at the vehicle lower side of the thinned portion 58, in the front bumper absorber 56. The first engagement portions 42 and the second engagement portions 64 respectively engage with the first engagement holes 30 and the second engagement recessed portions 54 of the front bumper reinforcement 50. Thus, even when the upper leg 60 and the lower leg 62 deform so as to collapse inward due to thermal contraction, the deformation is suppressed by the first engagement portions 42 and the second engagement portions 64. Hence the front bumper absorber 56 is straightened out so as to maintain a predetermined shape, even when the front bumper absorber 14 is influenced by thermal contraction.

In the first exemplary embodiment and the second exemplary embodiment described above, the first engagement holes 30, and the second engagement holes 32 or the second engagement recessed portions 54, are formed in the vicinity of both the vehicle width direction end portions 18 of the front bumper reinforcement 16, 50; however, configuration is not limited thereto, and a configuration may be applied that is provided at the vehicle width direction center portion of the front bumper reinforcement 16, 50. A configuration may be applied that is provided at both the end portions 18 and the center portion. In such cases, the first engagement portions 42 and the second engagement portions 46, 64 are obviously disposed aligned with positions of the first engagement holes 30, and the second engagement holes 32 or the second engagement recessed portions 54.

Exemplary embodiments of the present disclosure have been explained above; however, the present disclosure is not limited to the above description, and obviously various other modifications may be implemented within a range not departing from the spirit of the present disclosure.

What is claimed is:

1. A bumper absorber attachment structure comprising:
   bumper reinforcement that is provided at a vehicle front section and that is formed in an elongated shape with a length direction along a vehicle width direction;
   a first engaged portion that is formed at a vehicle upper side of at least one of both vehicle width direction end portions or a vehicle width direction center portion of a side face at a vehicle front side of the bumper reinforcement;
   a second engaged portion that is formed at a vehicle lower side of at least one of both the vehicle width direction end portions or the vehicle width direction center portion of the side face at the vehicle front side of the bumper reinforcement;
   a bumper absorber that includes a thinned portion open toward a vehicle rear side at a vehicle vertical direction center portion, an upper leg disposed at a vehicle upper side of the thinned portion and extending toward the vehicle rear side in a vehicle side cross-section view, and a lower leg disposed at a vehicle lower side of the thinned portion and extending toward the vehicle rear side in the vehicle side cross-section view, the bumper absorber abutting the side face at the vehicle front side of the bumper reinforcement, a cross-section profile of the bumper absorber orthogonal to the vehicle width direction being substantially U-shaped, including the upper leg configuring the vehicle upper side of the thinned portion and the lower leg configuring the vehicle lower side of the thinned portion;
   a first engagement portion that is formed at a vehicle rear side of the upper leg, and that engages with the first engaged portion such that the bumper absorber is restrained in an attached position with respect to the bumper reinforcement; and
   a second engagement portion that is formed at a vehicle rear side of the lower leg, and that engages with the second engaged portion in a case in which the bumper absorber is displaced toward the vehicle lower side in a collision.

2. The bumper absorber attachment structure of claim 1, wherein:
the first engaged portion and the second engaged portion are through-holes that pierce through a thickness direction of the side face at the vehicle front side of the bumper reinforcement, and that are respectively inserted with the first engagement portion and the second engagement portion.

3. The bumper absorber attachment structure of claim 1, wherein
the first engaged portion and the second engaged portion are formed at both the vehicle width direction end portions of the side face at the vehicle front side of the bumper reinforcement.

4. The bumper absorber attachment structure of claim 1, wherein
the first engagement portion is press-fit-fixed to the first engaged portion, and the second engagement portion is fitted together with the second engaged portion such that there is play therebetween.

5. The bumper absorber attachment structure of claim 1, wherein
the thinned portion of the bumper absorber has a rounded or flat surface disposed so as to face a vehicle rear direction, the surface forming a bottom of the U-shaped cross-section profile of the bumper absorber.

* * * * *